(12) United States Patent
Sugino et al.

(10) Patent No.: US 7,128,681 B2
(45) Date of Patent: Oct. 31, 2006

(54) TRANSMISSION

(75) Inventors: Soichi Sugino, Saitama (JP); Tuskasa Takahashi, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 170 days.

(21) Appl. No.: 10/984,944

(22) Filed: Nov. 10, 2004

(65) Prior Publication Data
US 2005/0101426 A1   May 12, 2005

(30) Foreign Application Priority Data
Nov. 12, 2003 (JP) ............................ P2003-382651

(51) Int. Cl.
*F16H 3/44* (2006.01)
(52) U.S. Cl. ...................................................... 475/218
(58) Field of Classification Search ................ 475/207, 475/218
See application file for complete search history.

(56) References Cited

U.S. PATENT DOCUMENTS

| | | | | |
|---|---|---|---|---|
| 2,923,176 | A * | 2/1960 | Randt ........................ | 475/218 |
| 5,593,358 | A * | 1/1997 | Frost ......................... | 475/218 |
| 5,689,998 | A * | 11/1997 | Lee ............................ | 74/371 |
| 5,885,182 | A * | 3/1999 | Forsyth ...................... | 475/207 |
| 5,971,883 | A * | 10/1999 | Klemen ...................... | 475/218 |
| 6,869,379 | B1* | 3/2005 | Voss et al. .................. | 475/218 |
| 2004/0083837 | A1* | 5/2004 | Gumpoltsberger et al. ... | 74/333 |
| 2005/0119088 | A1* | 6/2005 | Cimatti et al. .............. | 475/218 |

FOREIGN PATENT DOCUMENTS

JP        2000-266138        9/2000

* cited by examiner

*Primary Examiner*—Sherry Estremsky
(74) *Attorney, Agent, or Firm*—Westerman, Hattori, Daniels & Adrian, LLP.

(57) ABSTRACT

A transmission comprises a main shaft, a first countershaft parallel to the main shaft, a second countershaft disposed rotatably over the first countershaft, a third countershaft disposed coaxially with the first and second countershafts, first-third gear trains and a reverse gear train disposed rotationally between these parallel shafts, and a planetary gear train whose carrier is connected to the first countershaft, whose sun gear is connected to the second countershaft, and whose ring gear is connected to the third countershaft. The transmission comprises first-fourth clutches connecting or disconnecting the first-third gear trains and the reverse gear train to or from the main shaft and the first and second countershafts, a fifth clutch connecting the carrier and the sun gear or disconnecting them from each other, and a brake holding the sun gear stationary, the transmission realizing seven forward speed ranges and a reverse range.

12 Claims, 11 Drawing Sheets

Fig. 2

| Range | C 1 | C 2 | C 3 | C P | C R | B | Ratio(example) |
|---|---|---|---|---|---|---|---|
| Low | ○ |  |  |  | ○ |  | 3.459 |
| 2 n d | ○ |  |  |  |  | ○ | 2.028 |
| 3 r d | ○ |  |  | ○ |  |  | 1.200 |
| 4 t h | ○ | ○ |  |  |  |  | 0.929 |
| 5 t h |  | ○ |  | ○ |  |  | 0.700 |
| 6 t h |  | ○ | ○ |  |  |  | 0.551 |
| 7 t h |  |  | ○ | ○ |  |  | 0.480 |
| R v s |  |  |  | ○ | ○ |  | 2.000 |

Fig. 7

| Range | C 1 | C 2 | C 3 | C P | B | C H | Ratio(example) |
|---|---|---|---|---|---|---|---|
| L o w | ○ | | | | ○ | D | 2.914 |
| 2 n d | ○ | | | ○ | | D | 1.700 |
| 3 r d | ○ | ○ | | | | D | 1.157 |
| 4 t h | | ○ | | ○ | | D | 0.800 |
| 5 t h | | ○ | ○ | | | D | 0.576 |
| 6 t h | | | ○ | ○ | | D | 0.480 |
| R v s | | | ○ | ○ | | R | 2.000 |
| Super L | | ○ | ○ | | | R | 4.364 |
| Super L R | | | ○ | | ○ | R | 3.429 |

Fig. 10

| Range | C 1 | C 2 | C 3 | C P | C R | B | Ratio(example) |
|-------|-----|-----|-----|-----|-----|---|----------------|
| Low   |     | ○   |     |     | ○   |   | 2.902          |
| 2 n d |     | ○   |     |     |     | ○ | 1.634          |
| 3 r d | ○   | ○   |     |     |     |   | 1.057          |
| 4 t h |     | ○   |     | ○   |     |   | 0.760          |
| 5 t h |     | ○   | ○   |     |     |   | 0.579          |
| 6 t h |     |     | ○   | ○   |     |   | 0.480          |
| R v s |     |     |     | ○   | ○   |   | 2.000          |

TRANSMISSION

RELATED APPLICATIONS

This application claims the priority of Japanese Patent Application No. 2003-382651 filed Nov. 12, 2003, which is incorporated herein by reference.

FIELD OF THE INVENTION

The present invention relates to a transmission in which a planetary gear train is combined to a parallel shaft type transmission.

BACKGROUND OF THE INVENTION

Because of demands for improvements in fuel efficiency and acceleration performance, the numbers of speed change ratios or speed ranges available for transmissions have increased (refer to, for example, Japanese Laid-Open Patent Publication No. 2000-266138).

However, the increased number of speed change ratios or speed ranges also involves an increase in the number of engaging elements, which leads to an increase in the weight and cost of the transmission. For example, in the transmission described in patent reference 1, seven engaging elements are used for realizing six or seven speed change ratios as speed ranges in forward drive.

SUMMARY OF THE INVENTION

To solve the above mentioned problem, it is an object of the present invention to provide a transmission in which a planetary gear train is combined to a parallel shaft type transmission to achieve an increased number of speed change ratios with fewer engaging elements.

According to a first aspect of the present invention, a transmission comprises an input shaft (for example, the main shaft 3 described in the following embodiment), a countershaft (for example, the first countershaft 4 described in the following embodiment), which is disposed in parallel with the input shaft, and a planetary gear train, which includes a sun gear element, a carrier element and a ring gear element, the carrier element being connected to the countershaft and the ring gear element being connected to an output shaft (for example, the third countershaft 6 described in the following embodiment). This transmission further comprises a first gear train including a first drive gear, which is disposed rotatably over the input shaft, and a first driven gear, which meshes with the first drive gear and is disposed to rotate together with the countershaft as a one-piece body, first clutching means (for example, the first clutch C1 described in the following embodiment), which connects or disconnects the first drive gear to or from the input shaft, a second gear train including a second drive gear, which is disposed rotatably over the input shaft, and a second driven gear, which meshes with the second drive gear and is disposed to rotate together with the sun gear element as a one-piece body, second clutching means (for example, the second clutch C2 described in the following embodiment), which connects or disconnects the second drive gear to or from the input shaft, a reverse gear train including a reverse drive gear, which is disposed rotatably over the input shaft, a reverse driven gear, which is disposed to rotate together with the sun gear element as a one-piece body, and an idler gear, which meshes with the reverse drive gear and with the reverse driven gear, reverse clutching means (for example, the fourth clutch CR described in the following embodiment), which connects or disconnects the reverse drive gear to or from the input shaft, braking means (for example, the brake B described in the following embodiment), which can hold the sun gear element stationary, and planetary gear clutching means (for example, the fifth clutch CP described in the following embodiment), which connects the sun gear element and the carrier element or disconnects them from each other.

It is preferable that the transmission as the first aspect of the present invention further comprise a third gear train including a third drive gear, which is disposed rotatably over the input shaft, and a third driven gear, which meshes with the third drive gear and is disposed to rotate together with the countershaft as a one-piece body, and third clutching means (for example, the third clutch C3 described in the following embodiment), which connects or disconnects the third drive gear to or from the input shaft.

According to the first aspect of the present invention, in which the transmission comprises a parallel shaft transmission with a planetary gear train, for the torque input from the input shaft, the mode of the transmission can be switched among the following four conditions: the sun gear element is rotated in the direction opposite to that of the carrier element, the rotation of the sun gear element is stopped, the sun gear element is rotated together with the carrier element as a one-piece body (synchronization), and the sun gear element is rotated at a rotational speed higher than that of the carrier element. Therefore, by using the five engaging elements, five forward speed ratios and a reverse speed ratio can be realized for the transmission. In this way, the transmission can be equipped with a large number of speed change ratios by using only a relatively few engaging elements, and this is an improvement in reducing the weight of the transmission.

Furthermore, by adding one more gear train rotationally between the input shaft and the countershaft, the rotation of the carrier element can be switched between two rotational speeds, and by using the six engaging elements, seven forward speed ratios and a reverse speed ratio are realized for the transmission. In this way, the transmission can be equipped with a larger number of speed change ratios by using only a relatively few engaging elements.

According to a second aspect of the present invention, a transmission comprises an input shaft, a countershaft, which is disposed in parallel with the input shaft, a planetary gear train, which includes a sun gear element, a carrier element and a ring gear element, the carrier element being connected to the countershaft and the ring gear element being connected to an output shaft, a first gear train including a first drive gear, which is disposed rotatably over the input shaft, and a first driven gear, which meshes with the first drive gear and is disposed to rotate together with the countershaft as a one-piece body, first clutching means, which connects or disconnects the first drive gear to or from the input shaft, a second gear train including a second drive gear, which is disposed rotatably over the input shaft, and a second driven gear, which meshes with the second drive gear and is disposed to rotate together with the sun gear element as a one-piece body, second clutching means, which connects or disconnects the second drive gear to or from the input shaft, a third gear train including a third drive gear, which is disposed rotatably over the input shaft, and a third driven gear, which meshes with the third drive gear and is disposed rotatably with respect to the countershaft, a reverse gear train including a reverse drive gear, which is disposed rotatably over the input shaft, a reverse driven gear, which is disposed rotatably over the countershaft, and an idler gear, which meshes with the reverse drive gear and with the reverse driven gear, third clutching means, which connects or disconnects the third drive gear and the reverse drive gear simultaneously to or from the input shaft, forward/reverse switching clutching means (for example, the dogteeth clutch CH described in the following embodiment), which connects the third driven gear or the reverse driven gear to the countershaft, braking means, which can hold the sun gear element stationary, and planetary gear clutching means, which connects the sun gear element and the carrier element or disconnects them from each other.

According to the second aspect of the present invention, in addition to the forward six speed ranges and the reverse speed range, the transmission is realized to have a super Low range (that enables the wheels to rotate in the forward direction with a torque larger than that achieved by the Low range) and a super Low reverse range (that enables the wheels to rotate in the rearward direction with a torque larger than that achieved by the reverse speed range), which ranges are useful on roads in bad condition. Therefore, the transmission is equipped with a total of seven forward speed ratios and two reverse ratios by using only the six engaging elements. As described, this arrangement enables a transmission to acquire a large number of speed change ratios with a relatively few engaging elements, so it makes a contribution to the weight reduction of the transmission.

According to a third aspect of the present invention, a transmission comprises an input shaft, a countershaft, which is disposed in parallel with the input shaft, a planetary gear train, which includes a sun gear element, a carrier element and a ring gear element, the carrier element being connected to the countershaft and the ring gear element being connected to an output shaft, a first gear train including a first drive gear, which is disposed rotatably over the input shaft, and a first driven gear, which meshes with the first drive gear and is disposed to rotate together with the countershaft as a one-piece body, first clutching means, which connects or disconnects the first drive gear to or from the input shaft, a second gear train including a second drive gear, which is disposed rotatably over the input shaft, and a second driven gear, which meshes with the second drive gear and is disposed to rotate together with the sun gear element as a one-piece body, second clutching means, which connects or disconnects the second drive gear to or from the input shaft, a third gear train including a third drive gear, which is disposed to rotate together with the input shaft as a one-piece body, and a third driven gear, which meshes with the third drive gear and is disposed rotatably over the countershaft, third clutching means, which connects or disconnects the third driven gear to or from the countershaft, a reverse gear train including a reverse drive gear, which is disposed rotatably over the input shaft, a reverse driven gear, which is disposed to rotate together with the countershaft as a one-piece body, and an idler gear, which meshes with the reverse drive gear and with the reverse driven gear, reverse clutching means, which connects or disconnects the reverse drive gear to or from the input shaft, braking means, which can hold the carrier element stationary, and planetary gear clutching means, which connects the sun gear element and the carrier element or disconnects them from each other.

According to the third aspect of the present invention, the transmission is realized with six forward speed ratios and a reverse ratio by using only the six engaging elements. This arrangement also enables a transmission to acquire a large number of speed change ratios with a relatively few engaging elements, so it facilitates the weight reduction of the transmission. Moreover, according to this arrangement, one of the two engaging elements used for establishing each speed range from the Low range to the 5th speed range is fixed as a common engaging element in the shift control while the engagement and disengagement of the other engaging elements are controlled appropriately. As a result, a kickdown from a high speed range to a low speed range can be executed smoothly for acceleration.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only and thus are not limitative of the present invention.

FIG. 2 is a table describing relations between speed change ratios and clutches and a brake actuated in the first transmission.

FIG. 7 is a table describing relations between speed change ratios and clutches and a brake actuated in the second transmission.

FIG. 10 is a table describing relations between speed change ratios and clutches and a brake actuated in the third transmission.

DESCRIPTION OF THE PREFERRED EMBODIMENTS

Figure 1:
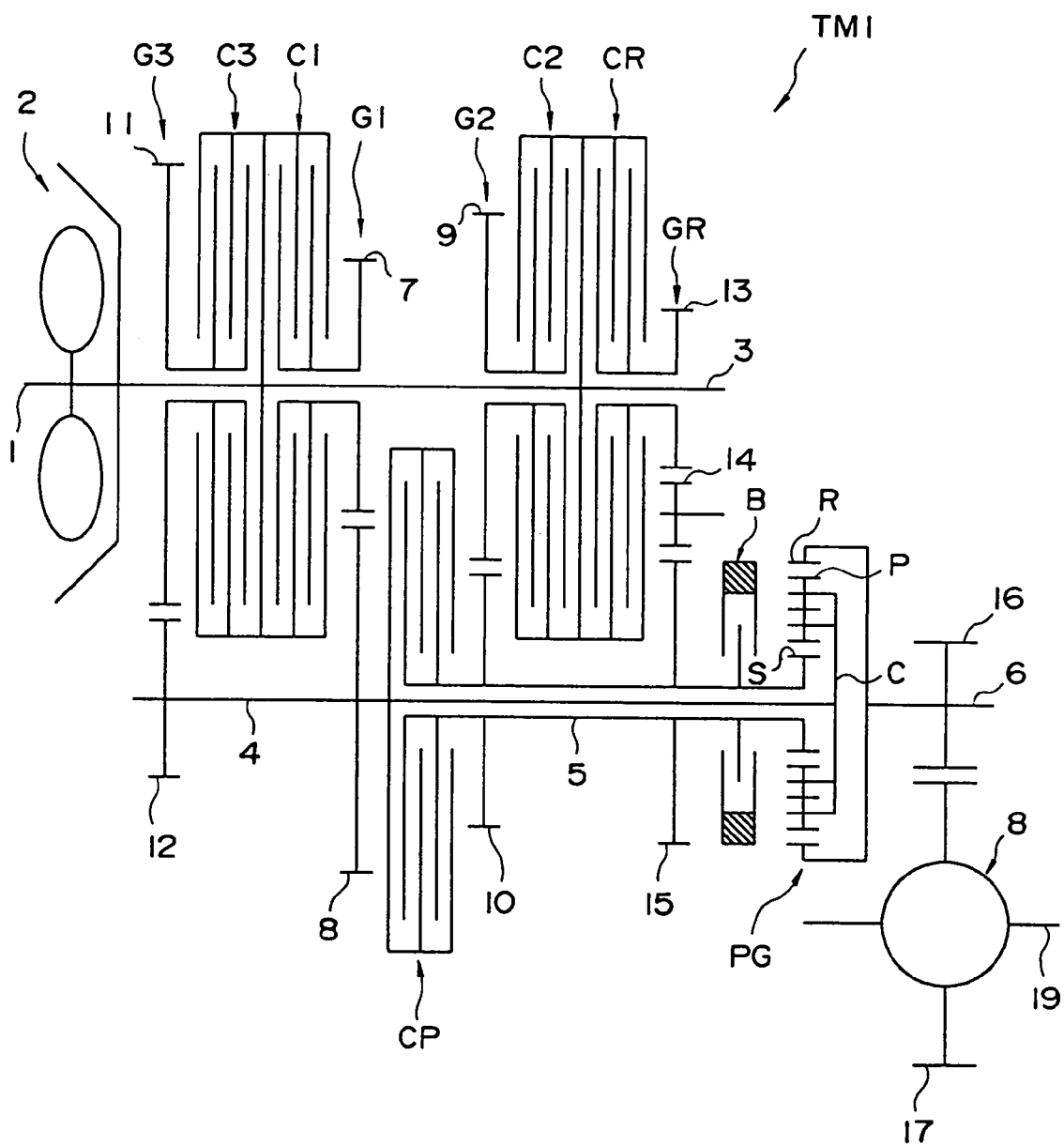
FIG. 1 is a skeleton diagram showing the construction of a transmission as a first embodiment (hereinafter referred to as "first transmission") according to the present invention.

Now, preferred embodiments according to the present invention are described in reference to the drawings. As shown in FIG. 1, a first transmission TM1 according to the present invention comprises a main shaft 3, which is the input shaft of the first transmission TM1, a first countershaft 4, which is disposed in parallel with the main shaft 3, a second countershaft 5, which is disposed rotatably over the first countershaft 4, a third countershaft 6, which is the output shaft of the first transmission TM1 and disposed coaxially with the first and second countershafts 4 and 5, a planetary gear train PG, which is connected to the first, second and third countershafts 4~6, four gear trains G1~G3 and GR, and six frictionally engaging means (a brake B and clutches C1~C3, CR and CP).

The planetary gear train PG comprises a sun gear S, pinions P (double pinions are arranged as shown in FIG. 1), a carrier C and a ring gear R. The rotational axis of the sun gear S is connected to the second countershaft 5, and the pinions P mesh with the sun gear S and rotate around their own axes and circle around the sun gear. The carrier C, whose rotational axis is connected to the first countershaft 4, retains the pinions P rotatably, and they together circle around the sun gear S. The ring gear R has internal gear teeth and meshes with the pinions P, and the ring gear R, whose rotational axis is connected to the third countershaft 6, is rotatable around the axis of the sun gear S. The main shaft 3 is connected through a torque converter 2 to the output shaft 1 of an engine. In this arrangement, the first and second countershafts 4 and 5 are coaxial with the third countershaft 6.

The sun gear S (the second countershaft 5) is provided with a brake B, which can hold the sun gear S stationary. In addition, a fifth clutch CP is provided on the first countershaft 4, so that the sun gear S and the carrier C (the first countershaft 4 and the second countershaft 5) are engaged with each other or disengaged from each other. Furthermore, first~third gear trains G1~G3 and a reverse gear train GR are provided rotationally between the main shaft 3 and the first countershaft 4 or the second countershaft 5. In this arrangement, while the sun gear S and the carrier C are connected with each other by the fifth clutch CP, the sun gear S and the carrier C (with the pinions P) rotate together as a one-piece body. As a result, the ring gear R also rotates together as if they were in a solid body, so the rotation of the first and second countershafts 4 and 5 is transmitted to the third countershaft 6 without any change. In other words, while the fifth clutch CP is engaged, there is no speed reduction in the planetary gear train. In this condition, the first transmission TM1 is a parallel shaft transmission that comprises the main shaft 3, the first, second and third countershafts 4~6, and the gear trains G1~G3 and GR, which connect these shafts rotationally.

The first gear train G1 comprises a first drive gear 7, which is disposed rotatably over the main shaft 3, and a first driven gear 8, which meshes with the first drive gear 7 and is fixed on the first countershaft 4, so that the first driven gear 8 rotates together with the first countershaft 4 as a one-piece body. A first clutch C1 is provided on the main shaft 3 to engage or disengage the first drive gear 7 to or from the main shaft 3. Therefore, while the first clutch C1 is engaged, the rotation of the main shaft 3 is reduced in speed by the reduction ratio of the first gear train G1, rotating the first countershaft 4 and the carrier C. In this condition, the first countershaft 4 rotates in the direction opposite to that of the main shaft 3.

The second gear train G2 comprises a second drive gear 9, which is disposed rotatably over the main shaft 3, and a second driven gear 10, which meshes with the second drive gear 9 and is fixed on the second countershaft 5, so that the second driven gear 10 rotates together with the second countershaft 5 as a one-piece body. A second clutch C2 is provided on the main shaft 3 to engage or disengage the second drive gear 9 to or from the main shaft 3. Therefore, while the second clutch C2 is engaged, the rotation of the main shaft 3 is reduced in speed by the reduction ratio of the second gear train G2, rotating the second countershaft 5 and the sun gear S. In this condition, the second countershaft 5 rotates in the direction opposite to that of the main shaft 3.

The third gear train G3 comprises a third drive gear 11, which is disposed rotatably over the main shaft 3, and a third driven gear 12, which meshes with the third drive gear 11 and is fixed on the first countershaft 4, so that the third driven gear 12 rotates together with the first countershaft 4 as a one-piece body. A third clutch C3 is provided on the main shaft 3 to engage or disengage the third drive gear 11 to or from the main shaft 3. Therefore, while the third clutch C3 is engaged, the rotation of the main shaft 3 is reduced in speed by the reduction ratio of the third gear train G3, rotating the first countershaft 4 and the carrier C. In this condition, the first countershaft 4 rotates in the direction opposite to that of the main shaft 3.

The reverse gear train GR comprises a reverse drive gear 13, which is disposed rotatably over the main shaft 3, an idler gear 14, which meshes with the reverse drive gear 13, and a reverse driven gear 15, which meshes with the idler gear 14 and is fixed on the second countershaft 5, so that the reverse driven gear 15 rotates together with the second countershaft 5 as a one-piece body. A fourth clutch CR is provided on the main shaft 3 to engage or disengage the reverse drive gear 13 to or from the main shaft 3. Therefore, while the fourth clutch CR is engaged, the rotation of the main shaft 3 is reduced in speed by the reduction ratio of the reverse gear train GR, rotating the second countershaft 5 and the sun gear S. In this condition, the second countershaft 5 rotates in the same direction as the main shaft 3 because of the presence of the idler gear 14 between the reverse drive gear 13 and the reverse driven gear 15.

These gear trains G1~G3 are designed to have reduction ratios in descending order. This arrangement of the reduction ratios is applied also in the other embodiments, which are described later in this section.

In the first transmission TM1, which are constructed as described above, the engagement and disengagement of the first~fifth clutches C1~C 3, CR and CP and the brake B are controlled in combination to set the planetary gear train PG, the first~third gear trains G1~G3 and the reverse gear train GR for establishing respective speed ranges. As a result, the torque input at the main shaft 3 is transmitted to the third countershaft 6 with a speed change achieved at each ratio of the speed ranges of the transmission.

The shift control of the first transmission TM1 achieves seven forward speed ranges (Low, 2nd, 3rd, 4th, 5th, 6th and 7th) and one reverse speed range (Rev) by controlling specifically the engagement and disengagement of the clutches and the brake as shown in FIG. 2. In the table shown in FIG. 2, each "O" represents the engaged state of the clutch (C1~C5) or brake (B) marked with it. The reduction ratio of each speed range is determined by the numbers of teeth of the gears that establish the respective speed range, and the reduction ratio changes if these numbers are changed. As an example, FIG. 2 shows a set of ratios.

It is clear from the table that each speed range is established by engaging two of the clutches C1~C3, CR, CP and brake B, which are hereinafter referred to also as "engaging elements". It is also clear that the shift from one speed range to a next upper or lower speed range is executed by releasing one of the two engaging elements that have been in engagement and by bringing another engaging element into engagement, instead. This way of shifting is called "sequential shifting", and sequential shifting makes the shift control of a transmission relatively simple.

Figure 3:
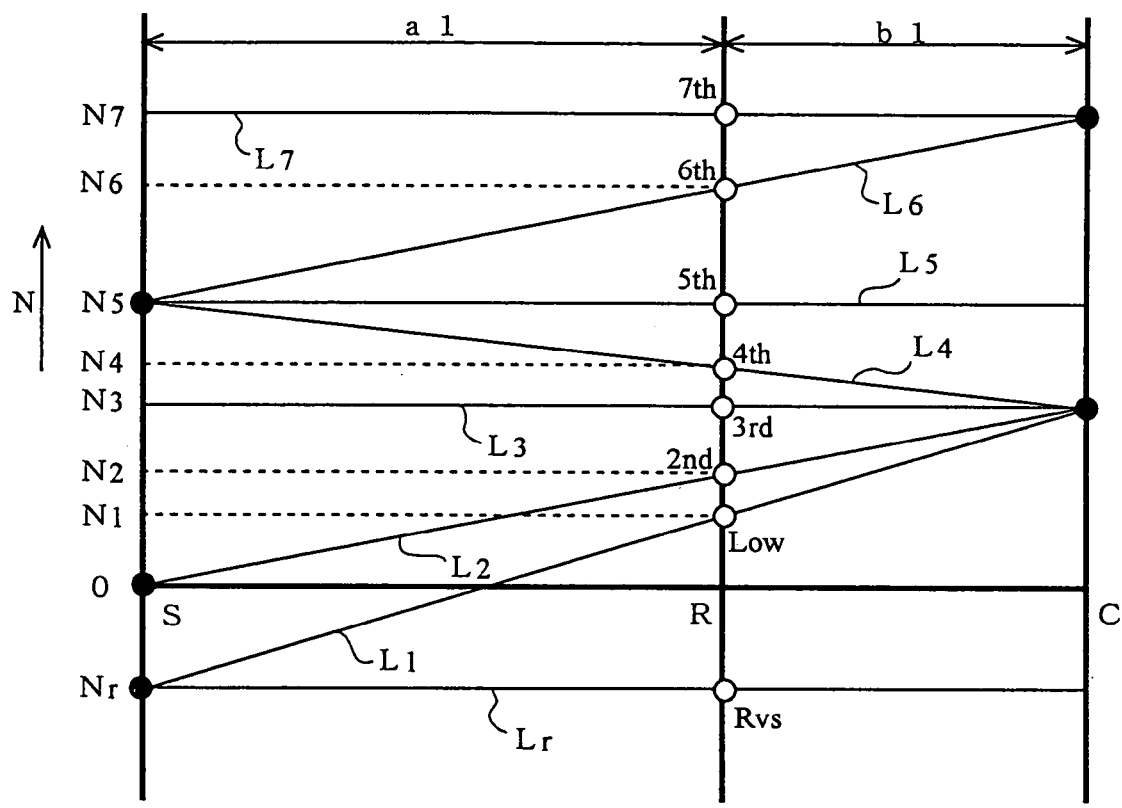
FIG. 3 is a velocity line diagram describing rotational relations among the elements of the planetary gear train of the first transmission.
Figure 4:
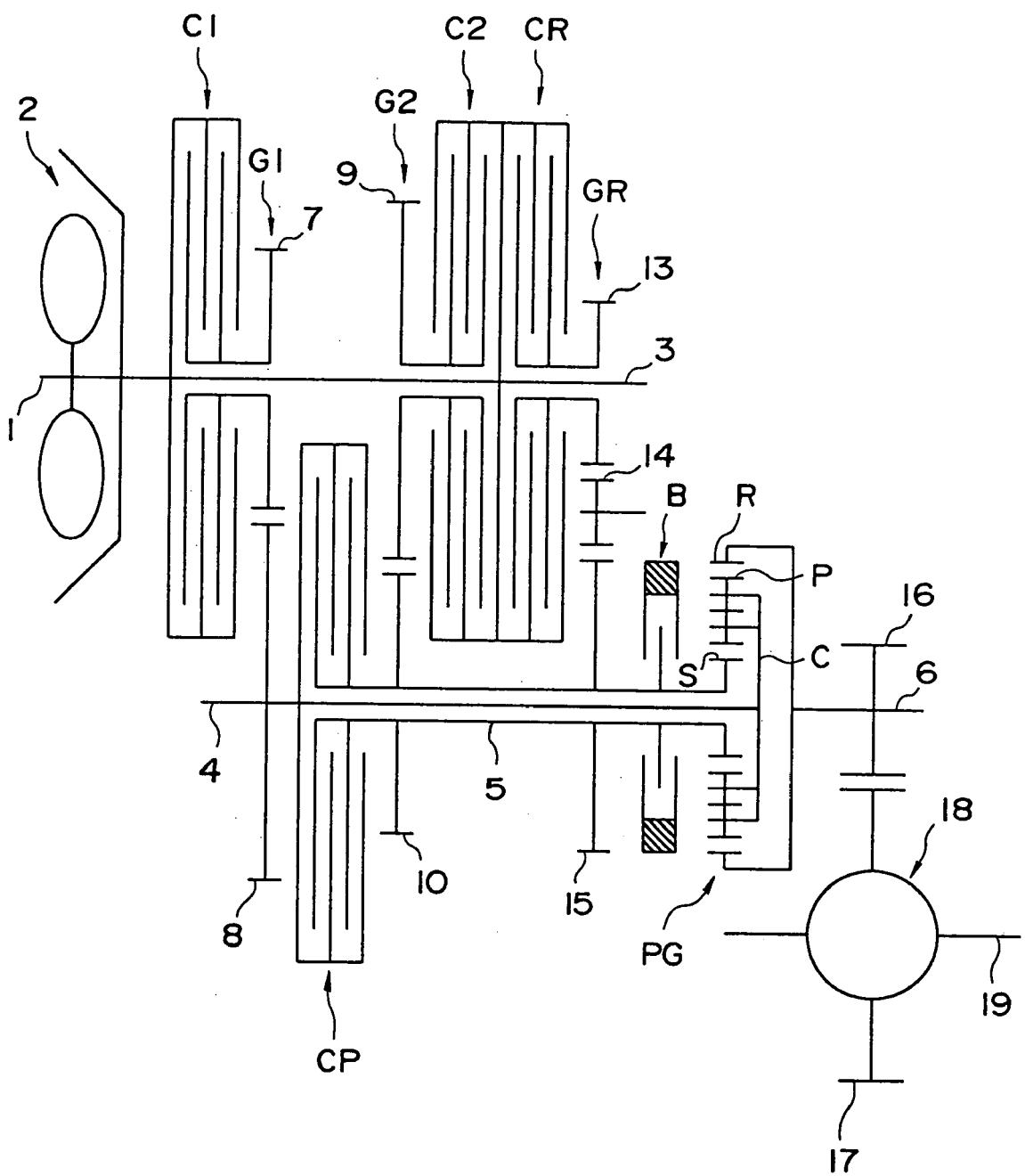
FIG. 4 is a skeleton diagram showing the construction of the transmission in which the third gear train of the first transmission is eliminated.
Figure 5:
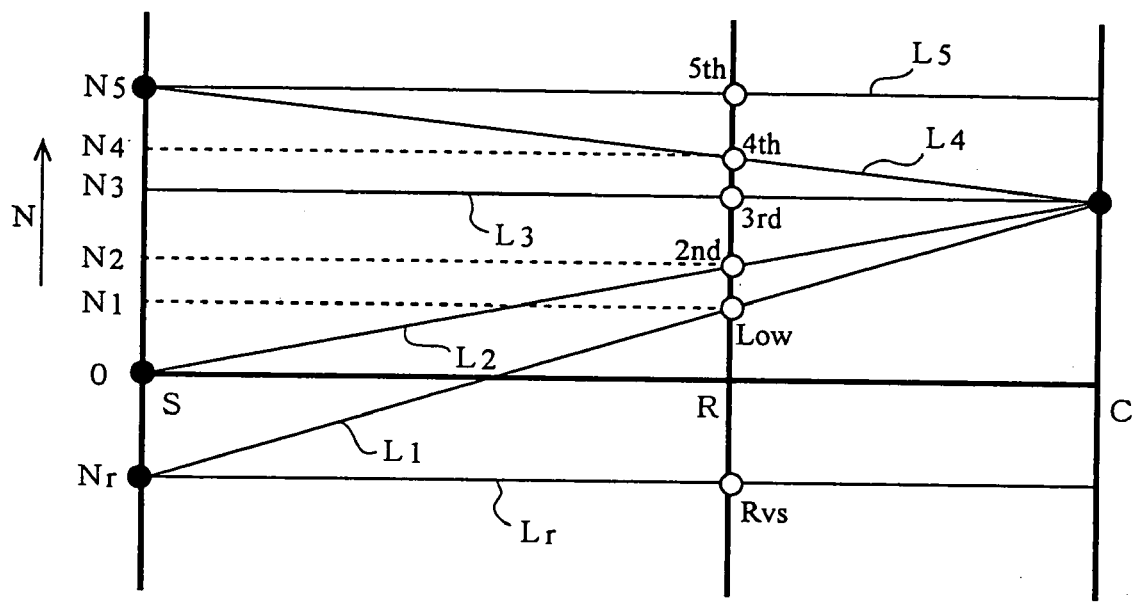
FIG. 5 is a velocity line diagram for this transmission, in which the third gear train of the first transmission is eliminated.

FIG. 3 is a line diagram describing relations in rotational speed among the elements of the planetary gear train PG of the transmission TM1. Referring to this diagram, the reduction ratio of each speed range is described below.

FIG. 3 describes the sun gear S, the carrier C and the ring gear R of the planetary gear train PG in a velocity line diagram. In this diagram, the vertical lines represent these rotational elements (the sun gear S, the ring gear R and the carrier C), and the length of each vertical line corresponds to the rotational speed N of the element represented by the respective vertical line. The distances between the vertical lines are proportional to the reciprocals of the numbers of teeth provided on the sun gear S and the ring gear R, respectively.

In FIG. 3, the three vertical lines represent, from the left side, the sun gear S, the ring gear R and the carrier C. The distance a1 between the vertical line representing the sun gear S and that representing the ring gear R corresponds to the reciprocal (=1/Zs) of the number of teeth Zs provided on the sun gear S, while the distance b1 between the vertical line representing the ring gear R and that representing the carrier C corresponds to the reciprocal (=1/Zr) of the number of teeth Zr provided on the ring gear R. Therefore, the rotational speed of the ring gear R is determined by the intersection of the vertical line representing the ring gear R and the line connecting the two points, one representing the rotational speed of the sun gear S on the corresponding vertical line and the other representing that of the carrier C on the corresponding vertical line.

Now, each speed range of the first transmission TM1 is described in reference to FIG. 3. For the Low range, the first clutch C1 and the fourth clutch CR are engaged to rotate the first countershaft 4 (the carrier C) at rotational speed N3, which is the speed reduced by the first gear train G1, and to rotate the second countershaft 5 (the sun gear S) at rotational speed Nr, which is the speed reduced by the reverse gear train GR. In this case, the second countershaft 5 is rotating in the direction opposite to that of the first countershaft 4 as mentioned above (therefore, this rotational speed of the second countershaft 5 is described as a negative value in the diagram of FIG. 3). As a result, the third countershaft 6 (the ring gear R) rotates at rotational speed N1, which is indicated by the intersection between the vertical line representing the ring gear R and the line L1 connecting these two points in FIG. 3.

For the 2nd speed range (2nd range), the fourth clutch CR, which has been engaged for the Low range, is released, and instead, the brake B is engaged. In this condition, while the first countershaft 4 (the carrier C) continues rotating at rotational speed N3, which is the speed reduced by the first gear train G1, the sun gear S (the second countershaft 5) is stopped and fixed by the brake B. As a result, the third countershaft 6 (the ring gear R) rotates at rotational speed N2, which is indicated by the intersection between the vertical line representing the ring gear R and the line L2 connecting these two points in FIG. 3.

For the 3rd speed range (3rd range), the brake B, which has been engaged for the 2nd speed range, is released, and instead, the fifth clutch CP is engaged. As a result, the planetary gear train PG rotates as a one-piece body by the engagement of the fifth clutch CP as mentioned above, so the first, second and third countershafts 4~6 rotate at rotational speed N3, which is the speed reduced by the first gear train G1 (this speed is represented by line L3 in FIG. 3).

For the 4th speed range (4th range), the fifth clutch CP, which has been engaged for the 3rd speed range, is released, and instead, the second clutch C2 is engaged. In this condition, while the first countershaft 4 (the carrier C) continues rotating at rotational speed N3, which is the speed reduced by the first gear train G1, the second countershaft 5 (the sun gear S) rotates at rotational speed N5, which is the speed reduced by the second gear train G2. As a result, the third countershaft 6 (the ring gear R) rotates at rotational speed N4, which is indicated by the intersection between the vertical line representing the ring gear R and the line L4 connecting these two points in FIG. 3.

For the 5th speed range (5th range), the first clutch C1, which has been engaged for the 4th speed range, is released, and instead, the fifth clutch CP is engaged. In this condition, because the planetary gear train PG rotates as a one-piece body by the engagement of the fifth clutch CP, the first, second and third countershafts 4~6 rotate at rotational speed N5, which is the speed reduced by the second gear train G2 (this speed is represented by line L5 in FIG. 3).

For the 6th speed range (6th range), the fifth clutch CP, which has been engaged for the 5th speed range, is released, and instead, the third clutch C3 is engaged. In this condition, while the second countershaft 5 (the sun gear S) continues rotating at rotational speed N5, which is the speed reduced by the second gear train G2, the first countershaft 4 (the carrier C) rotates at rotational speed N7, which is the speed reduced by the third gear train G3. As a result, the third countershaft 6 (the ring gear R) rotates at rotational speed N6, which is indicated by the intersection between the vertical line representing the ring gear R and the line L6 connecting these two points in FIG. 3.

For the 7th speed range (7th range), the second clutch C2, which has been engaged for the 6th speed range, is released, and instead, the fifth clutch CP is engaged. In this condition, because the planetary gear train PG rotates as a one-piece body by the engagement of the fifth clutch CP, the first, second and third countershafts 4~6 rotate at rotational speed N7, which is the speed reduced by the third gear train G3 (this speed is represented by line L7 in FIG. 3).

Lastly, for the reverse range (Rvs range), the fourth clutch CR and the fifth clutch CP are engaged. In this condition, because the planetary gear train PG rotates as a one-piece body by the engagement of the fifth clutch CP, the first, second and third countershafts 4~6 rotate at rotational speed Nr, which is the speed reduced by the reverse gear train GR (this speed is represented by line Lr in FIG. 3). Therefore, the rotation output is in the direction opposite to that of the forward drive ranges (Low~7th range).

The rotation of the third countershaft 6, whose rotational speed is changed in the transmission TM as described above, is then transmitted through a counter gear 16, which is fixed on the third countershaft 6, and through a final gear 17, which meshes with the counter gear 16, to a differential mechanism 18. This rotation is output to axle shafts 19 to drive wheels of the vehicle.

As described above, in the first transmission TM1, with the six engaging elements, the ring gear R (the third countershaft 6) is rotated by the rotation of the carrier C (the first countershaft 4), which rotation is changed by making the sun gear S (the second countershaft 5) rotate in the reversed direction, halt stationary or rotate in the forward direction. In addition, the ring gear R (the third countershaft 6) is rotated at different rotational speeds by the rotation of the carrier C (the first countershaft 4), which rotational speed is switched between the two speeds achieved through two gear trains (the first gear train G1 and the third gear train G3). In this way, the transmission is equipped with a large number of speed change ratios while the number of engaging elements used is kept as small as possible to make the weight of the transmission relatively light.

In the first transmission TM1, for the 3rd speed range, the 5th speed range and the 7th speed range, the fifth clutch CP is engaged to make the planetary gear train PG rotate as a one-piece body. In this condition, the transmission is a parallel shaft transmission, which comprises the main shaft 3 and the first, second and third countershafts 4~6. This arrangement eliminates power loss which can otherwise occur at the planetary gear train PG and improves the transmission efficiency of the transmission TM1 as a whole. Moreover, there is no circulation of the torque between the parallel shafts, which comprise the main shaft 3 and the first, second and third countershafts 4~6. In other words, the torque input from the main shaft 3 is transmitted through the gear trains to the first, second and third countershafts 4~6 and then output to the wheels. Therefore, each engaging element can be designed to have a relatively small clutching capacity, and this factor also improves the miniaturization and lightening of the transmission TM1.

From the above described construction, if the third gear train G3, which transmits the rotation of the main shaft 3 to the first countershaft 4, is eliminated together with the third clutch C3, which becomes unnecessary in this case, then a transmission is realized to have five forward speed change ratios and one reverse speed change ratio with five engaging elements. For this transmission, the same method as describe above can be applied for controlling the engaging elements to establish the speed ranges (the reverse range and the Low~5th range), so no further description is given here.

In the above described embodiment, for establishing the speed change ratio of the Low range, the rotation of the sun gear S is reversed by transmitting the rotation of the main shaft 3 through the reverse gear train GR to the second countershaft 5. However, if the reverse gear train GR is positioned rotationally between the main shaft 3 and the first countershaft 4, then the transmission can be adapted to have a super Low range and a super Low reverse range, which ranges are useful on roads in bad condition. In the following, a second transmission TM2 that has a super Low range and a super Low reverse range is described in reference to FIG. 6~FIG. 8. In the following explanation, the components identical with those of the first transmission TM1 are given the same numbers, respectively, to leave out the description of these components.

Figure 6:
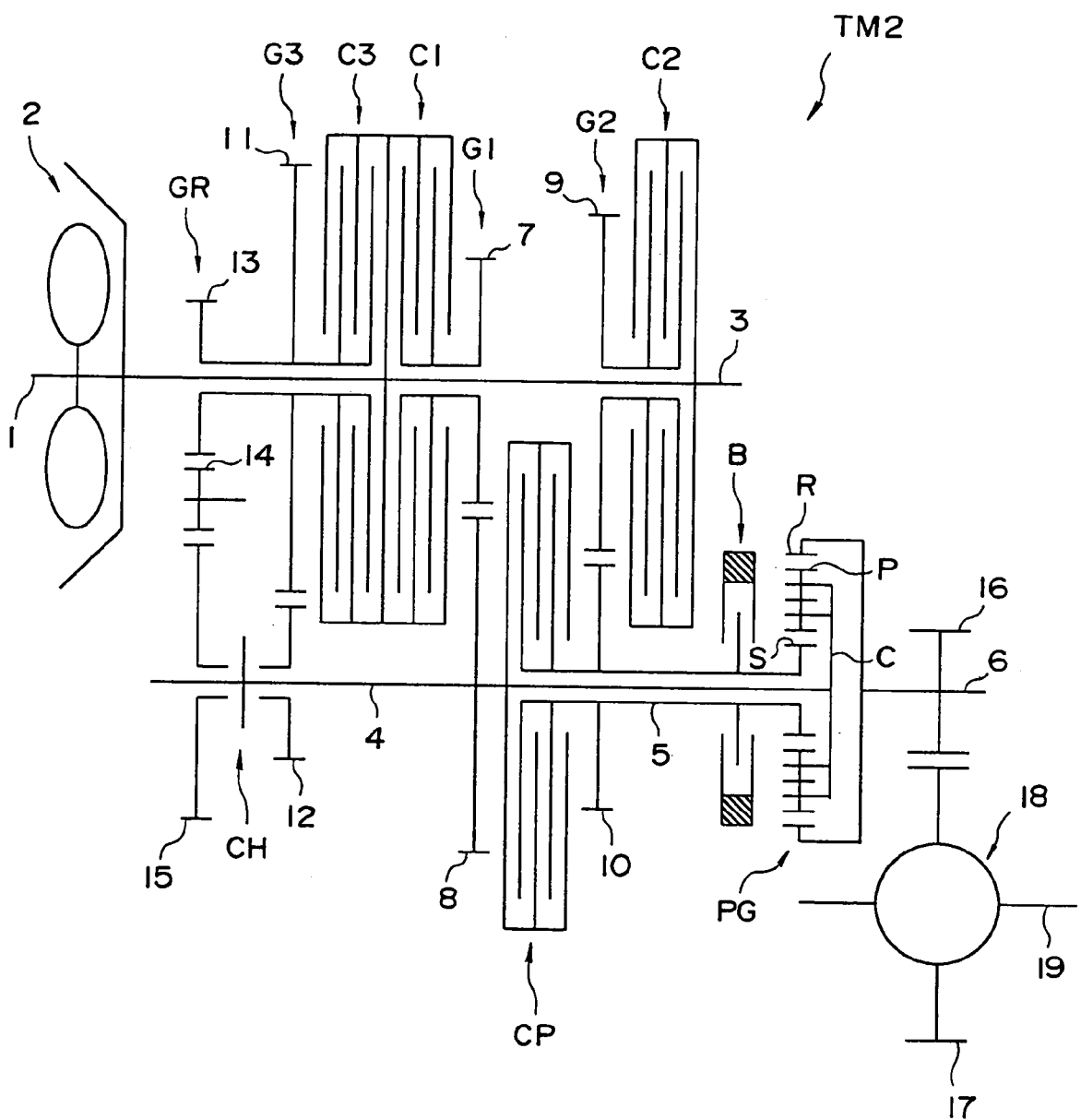
FIG. 6 is a skeleton diagram showing the construction of a transmission as a second embodiment (hereinafter referred to as "second transmission") according to the present invention.

In contrast with the construction of the first transmission TM1, the reverse gear train GR of the second transmission TM2 is positioned rotationally between the main shaft 3 and the first countershaft 4 as shown in FIG. 6. In other words, the reverse drive gear 13 is provided rotatably over the main shaft 3, the reverse driven gear 15 is provided rotatably over the first countershaft 4, and the idler gear 14 is positioned to mesh with both the reverse drive gear 13 and the reverse driven gear 15. Furthermore, the reverse drive gear 13 is designed to rotate together with the third drive gear 11 as a one-piece body, and these drive gears are engaged to or disengaged from the main shaft 3 by the third clutch C3. Moreover, the third driven gear 12 is provided rotatably over the first countershaft 4, and a dogteeth clutch CH is provided to engage the third driven gear 12 or the reverse driven gear 15 to the first countershaft 4.

Figure 8:
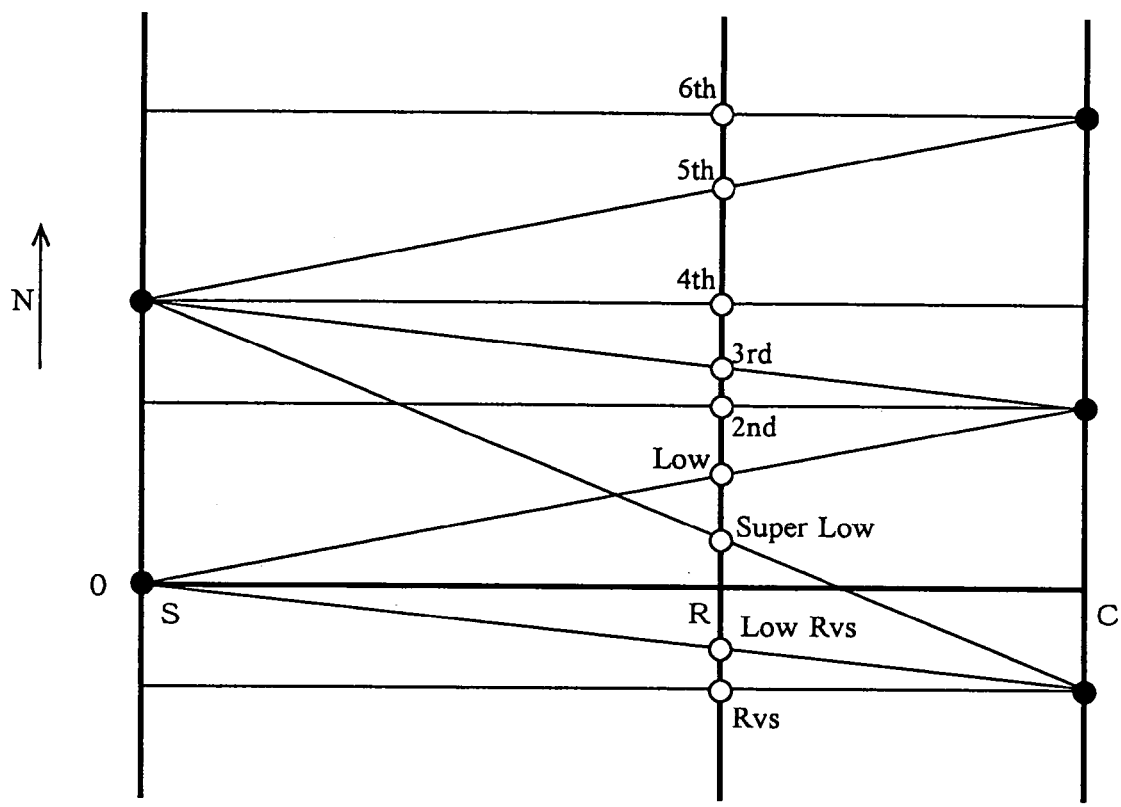
FIG. 8 is a velocity line diagram describing rotational relations among the elements of the planetary gear train of the second transmission.

Now, the control of the engaging elements for establishing the speed ranges of the second transmission TM2 is described in reference to FIG. 7 and FIG. 8. In the table of FIG. 7, the condition of the dogteeth clutch CH is described by "D" meaning that it is engaged to the third driven gear 12 or by "R" meaning that it is engaged to the reverse driven gear 15.

At first, for the normal forward ranges, i.e., the Low range~6th speed range, the dogteeth clutch CH is engaged to the third driven gear 12, and the other engaging elements are controlled in the same way as those of the first transmission TM1 are controlled for the 2nd speed range to the 7th speed range. In this case, the same gear trains and engaging elements are used, so no further description is given here. For the normal Rvs range, the dogteeth clutch CH is engaged to the reverse driven gear 15, the third clutch C3 is engaged to connect the reverse drive gear 13 to the main shaft 3, and the fifth clutch CP is engaged to rotate the planetary gear train PG as a one-piece body. In this condition, because of the engagement of the fifth clutch CP, the first and second countershafts 4 and 5 also rotate as a one-piece body. Therefore, the Rvs range of the second transmission TM2 is established in the same way as that of the first transmission TM1.

Now, the super Low range and the super Low reverse range that are realized with the second transmission TM2 are described. For either of these range, the dogteeth clutch CH is engaged to the reverse driven gear 15.

In the case of the super Low range (Super L range), the second clutch C2 and the third clutch C3 are engaged to rotate the sun gear S (the second countershaft 5) at the reduction ratio of the third gear train G3 and to rotate the carrier C (the first countershaft 4) at the reduction ratio of the reverse gear train GR in the direction opposite to that of the sun gear S. As a result, as shown in FIG. 8, the ring gear R (the third countershaft 6) rotates at a rotational speed that is lower than the Low range, so the super Low range can transmit a larger torque to the wheels.

On the other hand, for the super Low reverse range (Super LR), the third clutch C3 and the brake B are engaged to fix the sun gear S (the second countershaft 5) and to rotate the carrier C (the first countershaft 4) at the reduction ratio of the reverse gear train GR. As a result, as shown in FIG. 8, the ring gear R (the third countershaft 6) rotates at a rotational speed that is lower than the Rvs range, so the super Low reverse range can transmit a larger torque to the wheels.

In a conventional transmission, such super Low range and super Low reverse range for transmitting large torques have been realized by provision of a sub-transmission. However, the transmission according to the present invention can achieve this feature by a single transmission constructed as described for the second transmission TM2. This is an advantage for miniaturizing and lightening the whole transmission. In the skeleton diagram of FIG. 6, the planetary gear train PG has a double-pinion construction. However, it may have a single-pinion construction in correspondence to the speed change ratios required for the second transmission TM2.

In the first transmission TM1 and the second transmission TM2, which are described above, each speed range is established by engaging two of the six engaging elements. Furthermore, the engagement control in these transmissions is simplified by a sequential shifting in which one of the two engaging elements is released, and another engaging element is brought into engagement when the speed range is shifted upward or downward. However, the first transmission TM1 and the second transmission TM2 are not suitable for performing a smooth kickdown because a kickdown requires a downshift to a range that is lower than the current range by two ranges or more when the vehicle must accelerate while it is driving at a high speed range. This means that, in a kickdown, while both the engaging elements are being released in the first transmission TM1 or the second transmission TM2, other two engaging elements must be brought into engagement. This situation affects the smoothness of the shifting.

Figure 9:
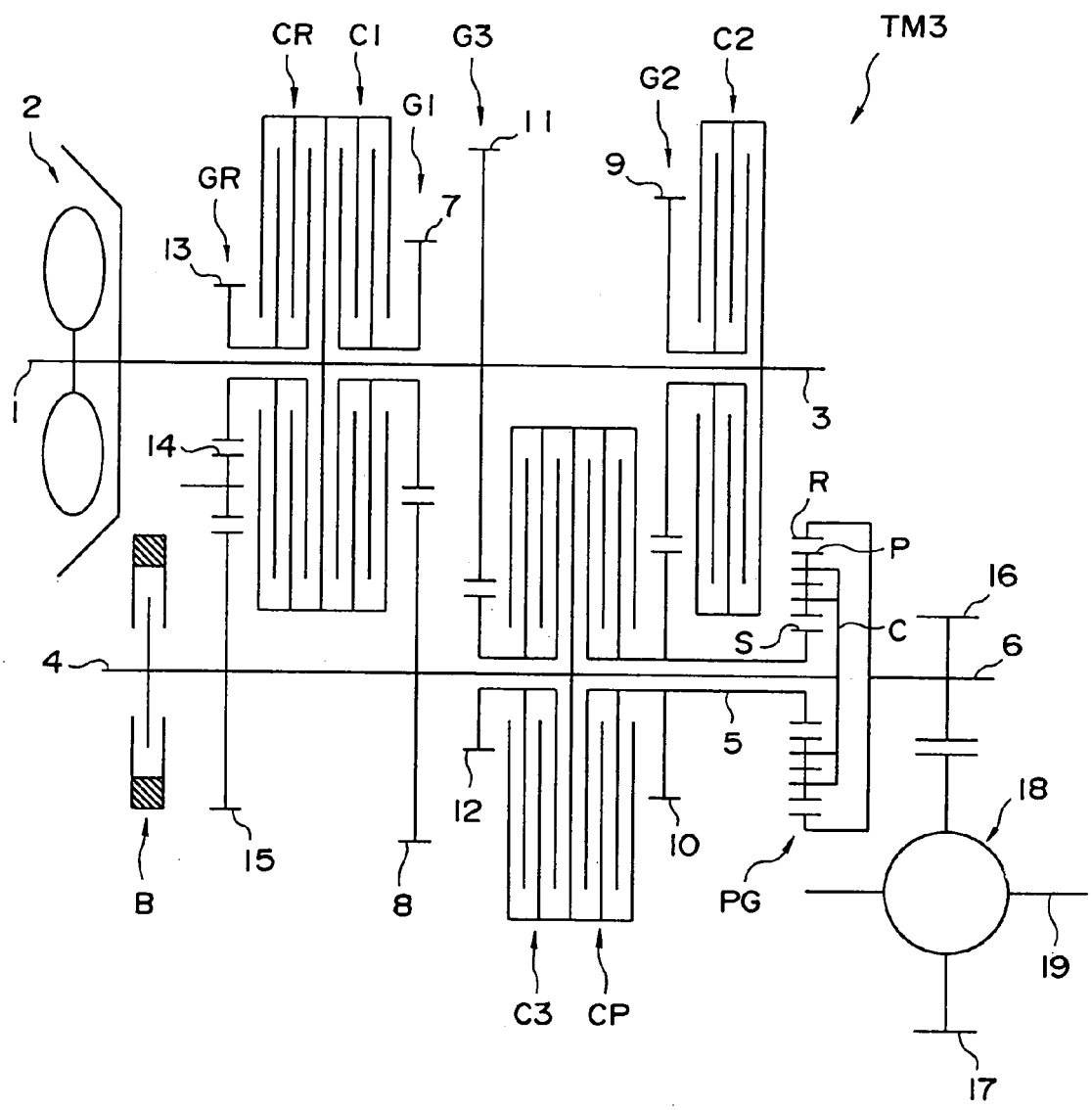
FIG. 9 is a skeleton diagram showing the construction of a transmission as a third embodiment (hereinafter referred to as "third transmission") according to the present invention.
Figure 11:
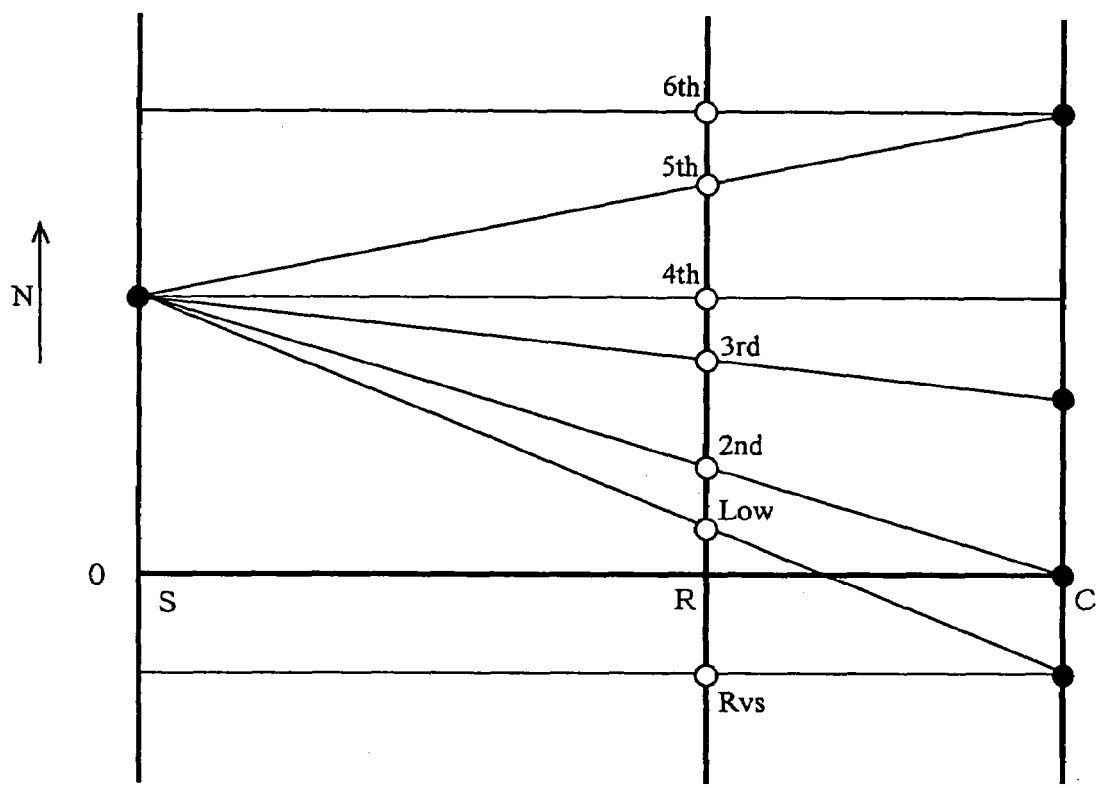
FIG. 11 is a velocity line diagram describing rotational relations among the elements of the planetary gear train of the third transmission.

To solve this problem, FIG. 9~FIG. 11 show a third transmission TM3 which comprises a common engaging element that functions as one of the two engaging elements used for establishing the Low range up to the 5th speed range of the forward six speed ranges. In the third transmission TM3, four gear trains (first~third gear trains G1~G3 and a reverse gear train GR) and six engaging elements (first~fifth clutches C1~C3, CR, CP and a brake B) are arranged around parallel shafts (a main shaft 3 and first, second and third countershafts 4~6) to constitute a parallel shaft transmission, and a planetary gear train PG is connected to the first, second and third countershafts 4~6.

The first gear train G1 comprises a first drive gear 7, which is disposed rotatably over the main shaft 3, and a first driven gear 8, which meshes with the first drive gear 7 and is fixed on the first countershaft 4. A first clutch C1 is provided on the main shaft 3 to engage or disengage the first drive gear 7 to or from the main shaft 3.

The second gear train G2 comprises a second drive gear 9, which is disposed rotatably over the main shaft 3, and a second driven gear 10, which meshes with the second drive gear 9 and is fixed on the second countershaft 5. A second clutch C2 is provided on the main shaft 3 to engage or disengage the second drive gear 9 to or from the main shaft 3.

The third gear train G3 comprises a third drive gear 11, which is fixed on the main shaft 3, and a third driven gear 12, which meshes with the third drive gear 11 and is disposed rotatably over the first countershaft 4. A third clutch C3 is provided on the first countershaft 4 to engage or disengage the third driven gear 12 to or from the first countershaft 4.

The reverse gear train GR comprises a reverse drive gear 13, which is disposed rotatably over the main shaft 3, an idler gear 14, which meshes with the reverse drive gear 13, and a reverse driven gear 15, which meshes with the idler gear 14 and is fixed on the first countershaft 4. A fourth clutch CR is provided on the main shaft 3 to engage or disengage the reverse drive gear 13 to or from the main shaft 3.

The carrier C can be held and fixed stationary by the brake B, which can hold and fix the first countershaft 4. The sun gear S, the carrier C and the ring gear R of the planetary gear train PG and the first, second and third countershafts 4~6 in the third transmission TM3 are connected in the same way as those in the first and second transmissions TM1 and TM2. Also, the fifth clutch CP, which connects or disconnects the sun gear S and the carrier C, is disposed on the first countershaft 4 in the same way.

Now, each speed range of the third transmission TM3, which is constructed as described above, is described in reference to FIG. 10 and FIG. 11. In the third transmission TM3, the second clutch C2 is engaged commonly from the Low range to the 5th speed range, and another engaging element (C1, C 3, CR, CP and B) is brought into engagement for establishing each speed range. In other words, while the sun gear S (the second countershaft 5) is being rotated at the reduction ratio of the second gear train G2, against this rotation of the sun gear S, the carrier C, which revolves around the sun gear S, is controlled in the following ways: reversed in rotation by the actuation of the fourth clutch CR, which engages the reverse gear train GR, establishing the Low range; stopped by the actuation of the brake B, establishing the 2nd speed range; rotated at a low speed by the actuation of the first clutch C1, which engages the first gear train G1, establishing the 3rd speed range; synchronized in rotation by the actuation of the fifth clutch CP, establishing the 4th speed range; and rotated at a high speed by the actuation of the third clutch C3, which engages the third gear train G3, establishing the 5th speed range. Each resultant rotation of the carrier shifts the rotation of the ring gear R (the third countershaft 6) correspondingly. For the 6th speed range, the planetary gear train PG is made to rotate as a one-piece body by the engagement of the fifth clutch CP, and the third countershaft 6 is rotated at the reduction ratio of the third gear train G3. For the Rvs range, also, the planetary gear train PG is made to rotate as a one-piece body by the engagement of the fifth clutch CP, and the third countershaft 6 is rotated at the reduction ratio of the reverse gear train GR.

As described above, in the third transmission TM3, the second clutch C2 is used as a commonly used engaging element for the two engaging elements that establish a speed range from the Low range to the 5th speed range. Therefore, a shift to any of these speed ranges is achieved only by changing the other one of the two engaging elements. As a result, a kickdown from a high speed range to a low speed range is executed smoothly.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A transmission comprising:
an input shaft;
a countershaft, which is disposed in parallel with said input shaft;
a planetary gear train, which includes a sun gear element, a carrier element and a ring gear element, said carrier element being connected to said countershaft and said ring gear element being connected to an output shaft;
a first gear train including a first drive gear, which is disposed rotatably over said input shaft, and a first driven gear, which meshes with said first drive gear and is fixed on said countershaft, so that said first driven gear and said countershaft can rotate together as a one-piece body;
first clutching means, which connects or disconnects said first drive gear to or from said input shaft;
a second gear train including a second drive gear, which is disposed rotatably over said input shaft, and a second driven gear, which meshes with said second drive gear and is connected to said sun gear element, so that said second driven gear can rotate together with said sun gear element as a one-piece body;
second clutching means, which connects or disconnects said second drive gear to or from said input shaft;
a reverse gear train including a reverse drive gear, which is disposed rotatably over said input shaft, a reverse driven gear, which is connected to said sun gear element so that said reverse driven gear can rotate together with said sun gear element as a one-piece body, and an idler gear, which meshes with said reverse drive gear and with said reverse driven gear;
reverse clutching means, which connects or disconnects said reverse drive gear to or from said input shaft;

braking means, which can hold said sun gear element stationary; and planetary gear clutching means, which connects said sun gear element and said carrier element or disconnects them from each other.

2. The transmission as set forth in claim 1, further comprising:

a third gear train including a third drive gear, which is disposed rotatably over said input shaft, and a third driven gear, which meshes with said third drive gear and is connected to said countershaft, so that said third driven gear can rotate together with said countershaft as a one-piece body; and third clutching means, which connects or disconnects said third drive gear to or from said input shaft.

3. The transmission as set forth in claim 1, further comprising a second countershaft, which is disposed coaxially and rotatably over said countershaft;

wherein:

said second countershaft is connected to said sun gear element; and said second driven gear and said reverse driven gear are fixed on said second countershaft, so that said second driven gear, said reverse driven gear and said second countershaft can rotate together as a one-piece body.

4. The transmission as set forth in claim 1, wherein:

said braking means holds and fixes said second countershaft to fix said sun gear element stationary.

5. A transmission comprising:

an input shaft;

a countershaft, which is disposed in parallel with said input shaft;

a planetary gear train, which includes a sun gear element, a carrier element and a ring gear element, said carrier element being connected to said countershaft and said ring gear element being connected to an output shaft;

a first gear train including a first drive gear, which is disposed rotatably over said input shaft, and a first driven gear, which meshes with said first drive gear and is fixed on said countershaft, so that said first driven gear and said countershaft can rotate together as a one-piece body;

first clutching means, which connects or disconnects said first drive gear to or from said input shaft;

a second gear train including a second drive gear, which is disposed rotatably over said input shaft, and a second driven gear, which meshes with said second drive gear and is disposed such that said second driven gear can rotate together with said sun gear element as a one-piece body;

second clutching means, which connects or disconnects said second drive gear to or from said input shaft;

a third gear train including a third drive gear, which is disposed rotatably over said input shaft, and a third driven gear, which meshes with said third drive gear and is disposed rotatably with respect to said countershaft;

a reverse gear train including a reverse drive gear, which is disposed rotatably over said input shaft, a reverse driven gear, which is disposed rotatably over said countershaft, and an idler gear, which meshes with said reverse drive gear and with said reverse driven gear;

third clutching means, which connects or disconnects said third drive gear and said reverse drive gear simultaneously to or from said input shaft;

forward/reverse switching clutching means, which connects said third driven gear or said reverse driven gear to said countershaft;

braking means, which can hold said sun gear element stationary; and planetary gear clutching means, which connects said sun gear element and said carrier element or disconnects them from each other.

6. The transmission as set forth in claim 5, further comprising a second countershaft, which is disposed coaxially and rotatably over said countershaft;

wherein:

said second countershaft is connected to said sun gear element; and said second driven gear is fixed on said second countershaft, so that said second driven gear and said second countershaft can rotate together as a one-piece body.

7. The transmission as set forth in claim 5, wherein:

said braking means holds and fixes said second countershaft to fix said sun gear element stationary.

8. The transmission as set forth in claim 5, wherein:

said forward/reverse switching clutching means comprises a dogteeth clutch, which is disposed on said countershaft.

9. A transmission comprising:

an input shaft;

a countershaft, which is disposed in parallel with said input shaft;

a planetary gear train, which includes a sun gear element, a carrier element and a ring gear element, said carrier element being connected to said countershaft and said ring gear element being connected to an output shaft;

a first gear train including a first drive gear, which is disposed rotatably over said input shaft, and a first driven gear, which meshes with said first drive gear and is fixed on said countershaft, so that said first driven gear and said countershaft can rotate together as a one-piece body;

first clutching means, which connects or disconnects said first drive gear to or from said input shaft;

a second gear train including a second drive gear, which is disposed rotatably over said input shaft, and a second driven gear, which meshes with said second drive gear and is disposed such that said second driven gear can rotate together with said sun gear element as a one-piece body;

second clutching means, which connects or disconnects said second drive gear to or from said input shaft;

a third gear train including a third drive gear, which is disposed to rotate together with the input shaft as a one-piece body, and a third driven gear, which meshes with said third drive gear and is disposed rotatably over said countershaft;

third clutching means, which connects or disconnects said third driven gear to or from said countershaft;

a reverse gear train including a reverse drive gear, which is disposed rotatably over said input shaft, a reverse driven gear, which is disposed to rotate together with said countershaft as a one-piece body, and an idler gear, which meshes with said reverse drive gear and with said reverse driven gear;

reverse clutching means, which connects or disconnects said reverse drive gear to or from said input shaft;

braking means, which can hold said carrier element stationary; and planetary gear clutching means, which connects said sun gear element and said carrier element or disconnects them from each other.

10. The transmission as set forth in claim 9, further comprising a second countershaft, which is disposed coaxially and rotatably over said countershaft;
wherein:
said second countershaft is connected to said sun gear element; and
said second driven gear is fixed on said second countershaft, so that said second driven gear and said second countershaft can rotate together as a one-piece body.

11. The transmission as set forth in claim 9, wherein:
said planetary gear clutching means connects said countershaft and said second countershaft with each other or disconnects them from each other, so that said sun gear element and said carrier element are connected with each other or disconnected from each other.

12. The transmission as set forth in claim 9, wherein:
said braking means holds and fixes said countershaft to fix said carrier element stationary.

\* \* \* \* \*